United States Patent Office 2,816,840
Patented Dec. 17, 1957

2,816,840

PROCESS FOR MAKING FULL-FLAVORED POWDERED FRUIT JUICE

Victor A. Turkot, Oreland, Roderick K. Eskew, Glenside, and Nicholas C. Aceto, Philadelphia, Pa., assignors to the United States of America as represented by the Secretary of Agriculture No Drawing. Application June 24, 1955,
Serial No. 517,954

6 Claims. (Cl. 99—206)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

Fruit juices in powdered form are valuable products because of their low weight and small bulk and especially because of their ability to withstand long storage at ordinary temperatures without the excessive flavor damage suffered by juice stored in any other form.

Most of the flavor and aroma of fruit juices are highly volatile and hence easily lost during the concentration of the juices. Concentrated juices are highly sensitive to heat damage during concentration. Also, fruit juice powders are extremely hygroscopic. These properties have made it economically impractical heretofore to produce powdered full-flavored fruit juices, despite the huge potential market for such products.

An improved process for making powdered fruit juice having excellent flavor and aroma is disclosed in the copending application of one of us (Eskew) entitled, "Process for Making Powdered Fruit Juices," filed January 10, 1955, Serial No. 481,041. In that process the volatile flavoring constituents are stripped from the juice and concentrated to an "essence" of 100- to 200-fold strength. The stripped juice is separately concentrated to about 70 to 85% solids content. The essence is then mixed with the juice and the mixture is further concentrated to 97 to 98% solids, preferably in an agitated falling film type vacuum evaporator. The product, when cooled, forms a brittle glass-like solid that is then ground to a coarse powder.

The above process, while far superior to prior processes, suffers from the disadvantage that a considerable part of the essence is lost from the product during the concentration of the product from 70-85% to 97-98% solids content.

The object of the present invention is to provide improved processes for making powdered, full-flavored fruit juices.

According to the invention fruit juice is concentrated to at least about 96% solids content and then, while in molten form and under super atmospheric pressure, is mixed with an appropriate amount of fruit "essence" of the type corresponding to the kind of juice being processed, that is, apple essence is added to apple juice, grape essence to grape juice, etc. By "essence" we mean a highly concentrated solution of the volatile flavoring and aromatic constituents of the juice. Such essences are usually obtained by volatilizing a portion of the fresh juice and then concentrating the volatilized portion in a fractionating column. Even when thus concentrated several hundred fold, the essence usually is still mostly water; hence, for use in the present invention it should be of as high strength as practicable. While we can use essences of only about 200-fold strength we prefer that they be of 500-fold or even 1000-fold strength in order to cause the minimum dilution of the concentrate.

After the essence is mixed with the molten juice concentrate the mixture is quickly cooled to avoid volatilization of the essence. The molten juice is typically at a temperature of 225–250° F. while the boiling point of the essence is usually somewhat below 212° F., hence it is surprising that the two can be mixed without instant flashing of the essence. The amount of essence that would be volatilized if the essence were to contact the molten concentrate at atmospheric pressure would be relatively large, especially when usually volatile or unusually highy concentrated essences are being used. For this reason we conduct the mixing of essence and juice concentrate at a superatmospheric pressure in the range of 4 to about 15 p. s. i. gauge. After the materials have been mixed under such pressure the pressure may be reduced to that of the atmosphere without appreciable loss of essence, especially when the product is cooled promptly thereafter.

A practical and convenient method for mixing the essence with the molten juice concentrate is to feed the essence at the proper rate into the discharge line of the pump that removes the concentrate from the vacuum evaporator in which it is concentrated. The mixture is then sent through one or more orifices to assure thorough blending. This orifice or orifices also serves the useful purpose of providing a suitable back pressure to maintain the mixture at superatmospheric pressure during blending. After being mixed the now full-flavored concentrate is conveniently cooled by discharging it onto a cold surface, suitably a water cooled roll or rolls, from which the now cold, brittle solid is removed and ground to a coarse powder. Because of its hygroscopicity, the product must be protected from moisture during cooling, grinding and packaging operations.

In a preferred embodiment of the invention the essence is mixed with sugar to form a sirup before being added to the juice concentrate. This sirup may suitably contain about 50 to 75% of sugar. This raises the boiling point thereby minimizing any tendency to flash. It also increases the viscosity and bulk of the essence thereby facilitating its metering and reducing any tendency to stratify when mixing.

In the cooling of the molten product it is highly advantageous to cool it in thin films or sheets. Because of its highly frangible nature, the cooled product is readily ground or crushed to the desired size provided sufficient heat to soften it and cause tackiness is not developed during the operation. In the preferred embodiment of the invention the molten product is applied as a thin sheet or film to the cold surface of the rolls or other cooling device. These films are cooled almost instantly to a hard, brittle solid that is easily removed as thin flakes by a doctor blade. The flakes are highly fragile and easily ground or crushed to the desired powder.

The practice of the invention is illustrated by the following example.

EXAMPLE I

*Full-flavored apple juice powder*

Fresh apple juice was stripped of volatile flavoring constituents and the latter concentrated to a 900-fold essence by conventional procedures. The stripped juice was depectinized and then concentrated to about 75° Brix under a 26½-inch vacuum. To each 1000 g. of concentrate was added an equal weight of 75° Brix sucrose solution and 28 ml. of 85% citric acid. The resulting mixture was then fed through a tubular preheater, which raised its temperature to 195° F., into a down-flow rotary-blade vacuum evaporator (Laboratory size Turba-Film Evaporator sold by Rodney-Hunt Machine Co., 43 Vale St., Orange, Mass.) operated at 145° F. and 23½ inches vacuum in the vapor space. At a feed rate of 47 lb./hr. the steam in the jacket was held at 23 p. s. i. g. to obtain a molten product at 245–50° F. and 25% moisture content. This product was continuously withdrawn from the evaporator by a pump. Into the discharge line of this product pump was inserted a smaller tube through which the essence was returned to the juice concentrate at the proper rate by a metering pump. Farther downstream in the product line there were two orifice inserts in spaced relationship, the function of which was to mix the molten concentrate and the essence. These orifices generated a back pressure of 15 p. s. i. g. on the product, which prevented flashing of the essence during mixing. The molten product was then fed continuously into the nip of a pair of chilled rolls (about 40° F.) rotating in opposite directions and spaced to give a flake thickness of about 0.023 inch. In about 10 seconds the product formed a brittle solid which was scraped from the rolls by doctor blades. These flakes were quite fragile and were easily ground to pass a 10-mesh screen with little production of fine powder. The cooling, grinding and packaging of the product were carried out in an atmosphere of less than 15% relative humidity to avoid caking of the product.

When 100 g. of the product was reconstituted by dissolving it in 620 ml. of cold water a beverage juice of about 13.5° Brix was obtained which had the color, flavor and aroma of fresh apple juice.

When other fruit or berry juices, such as grape, cherry, blackberry and blueberry juice were used instead of the apple juice of Example I equally satisfactory results were obtained.

The addition of sugar or sugar sirup to the juice or juice concentrate before the final concentration step is optional, though it has the advantage of minimizing heat damage in the final concentration, as well as extending and reducing the cost of the product. Also, the flavor of juices naturally deficient in sugar, such as cherry or blackberry juice, is markedly improved by the addition of sugar. Likewise, the addition of fruit acid, such as citric or tartaric, is optional but improves the flavor of some juices.

The amount of essence added to the juice concentrate is usually approximately the same as was obtained from the juice being processed. More or less may be used however depending on the palatability of the product.

The extent to which the juice and the essence are concentrated before being mixed together may be varied somewhat, the critical requirement being that the final product shall have a moisture content such that it will not become tacky on grinding or on storage. In general this corresponds to a maximum moisture content of between 3 and 4% depending on the fruit. Thus, if the juice is very highly concentrated, say to 98% or higher solids content, then a more dilute essence, say 200 to 400-fold may be used. On the other hand, if juice of only about 96% solids is used, then the essence must be very potent; say about 1000-fold or more.

We claim:

1. A process for making powdered, full-flavored fruit juice comprising stripping the volatile flavoring materials from fruit juice; concentrating the stripped juice to at least about 96% solids; separately concentrating the volatile flavoring materials to an essence of at least about 200-fold strength; mixing the concentrated juice and essence while both are in liquid form and under super atmospheric pressure to prevent flashing of the essence; quickly cooling the product thus obtained to a temperature at which it is a brittle solid; and reducing said solid to a powder.

2. A process for making powdered, full-flavored fruit juice comprising mixing fruit essence of at least about 200-fold strength with fruit juice concentrate of at least about 96% solids content, said concentrate being in molten form and under super atmospheric pressure to prevent flashing of the essence; quickly cooling the mixture thus obtained to a temperature at which it is a brittle solid; and reducing said solid to a powder.

3. A process for making powdered, full-flavored fruit juice comprising stripping volatile flavoring materials from fruit juice; concentrating said flavoring materials to an essence of at least about 200-fold strength; separately concentrating the stripped juice to obtain a molten concentrated juice of at least 96% solids content; continuously adding said essence to said molten juice and thoroughly mixing therewith under super atmospheric pressure to prevent flashing of the essence; continuously discharging the molten, essence-containing concentrated juice in a thin layer onto a chilled surface to quickly cool and solidify the molten product to a brittle solid; and reducing said solid to a powder.

4. A process for making a fruit juice powder comprising continuously adding essence of at least about 200-fold strength to a molten fruit juice concentrate of at least 96% solids content and thoroughly mixing therewith under super atmospheric pressure to prevent flashing of the essence; continuously discharging the molten, essence-containing concentrated juice in a thin layer onto a chilled surface to quickly cool and solidify the molten product to a brittle solid; and reducing said solid to a powder.

5. A process for making a fruit juice powder comprising stripping volatile flavoring materials from fruit juice, concentrating said flavoring materials to an essence of at least about 200-fold strength; separately concentrating the stripped juice to obtain a concentrate of about 75% solids, adding to the juice concentrate ingredients selected from the group consisting of sugars and fruit acids; concentrating the resulting mixture to obtain a molten concentrated juice product of at least 96% solids content; continuously adding said essence to said molten juice product and thoroughly mixing therewith under super atmospheric pressure to prevent flashing of the essence; continuously discharging the molten, essence-containing concentrated juice product in a thin layer onto a chilled surface to quickly cool and solidify the molten product to a brittle solid; and reducing said solid to a powder.

6. A process for making powdered, full-flavored fruit juice comprising mixing fruit essence of at least about 200-fold strength with fruit juice concentrate of at least about 96% solids content, said concentrate being in molten form and under pressure in the range of 4 to about 15 p. s. i gauge to prevent flashing of the essence; cooling the mixture thus obtained in about 10 seconds to a temperature at which it is a brittle solid; and reducing said solid to a powder.

References Cited in the file of this patent

UNITED STATES PATENTS

| | | |
|---|---|---|
| 981,405 | Fernbach | Jan. 10, 1911 |
| 1,189,127 | Kellogg | June 27, 1916 |
| 2,513,813 | Milleville | July 4, 1950 |
| 2,567,038 | Stevens et al. | Sept. 4, 1951 |
| 2,572,846 | Homiller et al. | Oct. 30, 1951 |